Patented Jan. 9, 1951

2,537,854

UNITED STATES PATENT OFFICE 2,537,854

TETRAHYDROPYRIDINES AND METHOD OF MANUFACTURE

John Thomas Plati, Passaic, and Wilhelm Wenner, Montclair, N. J., assignors to Hoffmann-La Roche Inc., Nutley, N. J., a corporation of New Jersey No Drawing. Application July 8, 1949, Serial No. 103,752

13 Claims. (Cl. 260—297)

The present invention relates to the production of new tetrahydropyridines and more particularly to 1-lower alkyl-3-benzoyl-4-phenyl-1,2,5,6-tetrahydropyridines and their salts. The compounds are useful for pharmaceutical purposes, more specifically as spasmolytics.

In general, the 1-lower alkyl-3-benzoyl-4-phenyl-1,2,5,6-tetrahydropyridines can be prepared by reacting a 1-lower alkyl-3-carbalkoxy-4-piperidone with lithium phenyl, in the ratio of about two moles of the phenyl lithium to one mole of the 4-piperidone compound.

The 1-lower alkyl-3-benzoyl-4-phenyl-1,2,5,6-tetrahydropyridines readily form acid addition salts with organic and inorganic acids.

The following examples will serve to illustrate the invention.

EXAMPLE 1

*1-methyl-3-benzoyl-4-phenyl-1,2,5,6-tetrahydropyridine*

A solution of lithium phenyl was prepared in the known manner from 67 grams of lithium, 725 grams of bromobenzene and 700 cc. of dry ether. To this solution 680 grams of 1-methyl-3-carbethoxy-4-piperidone in 2 liters of ether were added with stirring over a period of three hours at a temperature of 0 to $-3°$ C. Stirring was continued for one hour longer at $0°$ C. and for another hour at 20 to $30°$ C. The reaction mixture was cooled to $5-10°$ C. and 4000 cc. of 6.5% sulphuric acid were slowly added thereto. After standing for about 16 hours, the mixture was filtered from the lithium carbonate that had formed. The filtrate consisted of two layers. The aqueous layer was separated and extracted three times with 400 cc. portions of ether. The combined ether extracts were dried over sodium sulfate. The dried ether solution was then refluxed in a Soxhlet apparatus charged with 180 grams of oxalic acid and the refluxing ether was allowed to percolate through the oxalic acid. A gummy precipitate formed. The supernatant ether was decanted therefrom and the residue was crystallized from methanol. Crystals of 1-methyl-3-benzoyl-4-phenyl-1,2,5,6-tetrahydropyrdine oxalate were obtained having a melting point of $159-160°$ C.

An aqueous suspension of the oxalate in 300 cc. of water was shaken with an excess of sodium hydroxide and ether. The ether solution was dried with sodium sulphate and evaporated to dryness. The residue was crystallized from heptane to yield the free base, 1-methyl-3-benzoyl-4-phenyl-1,2,5 6-tetrahydropyridine, melting point $96-98°$ C. The hydrochloride was prepared by passing hydrogen chloride into an ether solution of the free base to yield 1-methyl-3-benzoyl-4-phenyl-1,2,5 6-tetrahydropyridine hydrochloride, melting point $194-195°$ C.

The 1-methyl-3-benzoyl-4-phenyl-1,2,5,6-tetrahydropyridine can also be prepared by dehydrating 1-methyl-3-benzoyl-4-hydroxy-4-phenyl-piperidine with acetic anhydride in the presence of sulfuric acid, as illustrated by the following example.

EXAMPLE 2

A mixture of 174 grams of 1-methyl-3-benzoyl-4-hydroxy-4-phenyl-piperidine, 870 cc. of acetic anhydride and one cc. of concentrated (about 95% by weight) sulfuric acid was heated on a steam bath for 2.5 hours with occasional shaking. The excess of acetic anhydride together with the acetic acid formed in the reaction was removed in vacuo, the temperature of the reaction mixture being gradually raised to about $90-100°$ C. by heating on a water bath. The residue was suspended in 550 cc. of water, and the mixture was cooled to about $20°$ C. 500 cc. of ether was added and the mixture was stirred and neutralized by slow addition of 140 grams of sodium carbonate. The lowest of the three layers which formed after neutralization was discarded. The remaining two layers were shaken with 140 cc. of water. The ether layer was separated and extracted with 70 cc. of a 10% sodium carbonate solution and then twice with 150 cc. portions of water. The extracted ether solution was dried with sodium sulfate and treated with an ethereal solution of oxalic acid until no further precipitate was obtained. The precipitate was filtered and crystallized from 1700 cc. of alcohol. Crystals of 1-methyl-3-benzoyl-4-phenyl-1,2,5,6-tetrahydropyridine oxalate melting at $162-165°$ C. were obtained. Upon recrystallization from ethanol the compound melted at $163-164°$ C.

A solution of 20 grams of the 1-methyl-3-benzoyl-4-phenyl-1,2,5,6-tetrahydropyridine oxalate in 40 cc. of ethanol and 34 cc. of water was cooled rapidly to $25°$ C. and treated with sodium hydroxide, until the mixture was distinctly alkaline. The mixture was stirred in an ice bath until the oily precipitate which first appeared became solid. The solid was filtered and dried, digested with alcohol, and the resulting solution filtered to remove any insoluble material. To the filtrate were added about 50 cc. of water, and the mixture was allowed to crystallize slowly, first at room temperature then at about $4°$ C. The crystals of the free base, 1-methyl-3-benzoyl-4-phenyl-1,2 5,6-tetrahydropyridine, thus obtained melted at $95-96°$ C. Dry hydrogen chloride was passed into an ether solution of the free base. The hydrochloride of 1-methyl-3-benzoyl-4-phenyl-1,2,5,6-tetrahydropyridine formed, melting point $194-195°$ C.

EXAMPLE 3

*1-ethyl-3-benzoyl-4-phenyl-1,2,5,6-tetrahydropyridine*

A solution of 270 parts of 1-ethyl-3-carbethoxy-4-piperidone in 800 parts of anhydrous ether was added over a period of one hour at 0 to —8° C., while stirring, to an ether solution of lithium phenyl prepared in the known manner from 45.2 grams of lithium and 512 grams of bromobenzene. Stirring was continued for another 1.5 hours at 0° C. and for one additional hour at 20–30° C. After cooling to 0° C. a solution of 165 grams of 97% sulfuric acid in 400 cc. of water was added. The ether and aqueous layers which formed were separated, and the aqueous layer was extracted four times with 400 cc. portions of ether. The original ether layer and the ether extracts were combined and dried with sodium sulfate. The dried solution was refluxed in a Soxhlet extractor charged with an excess of oxalic acid so that it percolated through the oxalic acid. A gummy precipitate of 1-ethyl-3-benzoyl-4-phenyl-1,2,5,6-tetrahydropyridine oxalate was formed. The liquid was decanted from the precipitate and the latter was crystallized from 2400 cc. of methanol, to yield the oxalate, melting point 155–156° C.

A solution of 20 grams of the oxalate in 500 cc. of methanol was treated while maintaining the temperature below 10° C. with 250 cc. of water and then with 25 cc. of 40% sodium hydroxide. Upon addition of 1000 cc. of water the base 1-ethyl-3-benzoyl-4-phenyl-1,2,5,6-tetrahydropyridine precipitated. After drying it was crystallized from ethanol-water. The free base melts at 82–83° C. The purified base was dissolved in dry ether and hydrogen chloride was introduced into the solution. The hydrochloride which formed was crystallized from 5 cc. of ethanol and 8 cc. of ether. The thus purified hydrochloride melts at 181–182° C.

EXAMPLE 4

*1-isopropyl-3-benzoyl-4-phenyl-1,2,5,6-tetrahydropyridine*

150 grams of 1-isopropyl-3-carbethoxy-4-piperidone in 500 cc. of ether were added over a period of one hour at 0° C. to an ether solution of lithium phenyl obtained in the known manner from 27.8 grams of lithium and 314 grams of bromobenzene. The reaction was carried out under an atmosphere of nitrogen. After stirring for an additional hour at 0° C. the mixture was allowed to stand for sixteen hours at 20–30° C. It was then cooled to 5–10° C. and neutralized with a solution of 102 grams of 96% sulfuric acid in 300 cc. of water. A precipitate formed which was dissolved by the addition of more water. The organic and aqueous layers which formed were separated, and the aqueous layer was extracted three times with 600 cc. portions of ether. The ether extracts were combined with the organic layer. The combined solution was dried over sodium sulfate and refluxed in a Soxhlet extractor charged with an excess of oxalic acid whereby there was precipitated the oxalate of 1-isopropyl-3-benzoyl-4-phenyl-1,2,5,-6-tetrahydropyridine. The liquid was decanted from the crude oxalate precipitate, and the latter was triturated with 800 cc. of acetone, and then suspended in water and ether, and treated with 20 grams of potassium hydroxide in 100 cc. of water. The ether layer was separated and the aqueous layer was extracted with ether. The ether extracts were combined with the original ether layer and dried over sodium sulfate. Dry hydrogen chloride gas was passed into the dried ether solution whereupon the hydrochloride of 1-isopropyl-3-benzoyl-4-phenyl-1,2,5,6-tetrahydropyridine crystallized. The hydrochloride after recrystallization from ethanol melts at 198–200° C.

The free base was obtained from the hydrochloride by treating the latter with 40% sodium hydroxide solution. The base initially separated as an oil which on standing crystallized. The free base was recrystallized by dissolving it in ethanol, adding water and then adding a few drops of ethanol in excess. The base has a melting point of 73–74° C.

We claim:

1. A compound of the group consisting of 1-lower alkyl-3-benzoyl-4-phenyl-1,2,5,6-tetrahydropyridines and the acid addition salts thereof.

2. A compound of the group consisting of 1-methyl-3-benzoyl-4-phenyl-1,2,5,6-tetrahydropyridine and the acid addition salts thereof.

3. A compound of the group consisting of 1-ethyl-3-benzoyl-4-phenyl-1,2,5,6-tetrahydropyridine and the acid addition salts thereof.

4. A compound of the group consisting of 1-isopropyl-3-benzoyl-4-phenyl-1,2,5,6-tetrahydropyridine and the acid addition salts thereof.

5. 1-methyl-3-benzoyl-4-phenyl-1,2,5,6-tetrahydropyridine.

6. 1-ethyl-3-benzoyl-4-phenyl-1,2,5,6-tetrahydropyridine.

7. 1-isopropyl-3-benzoyl-4-phenyl-1,2,5,6-tetrahydropyridine.

8. The process which comprises reacting a 1-lower alkyl-3-carbalkoxy-4-piperidone with lithium phenyl in the ratio of about two moles of the phenyl lithium to one mole of the said 4-piperidone compound, so as to produce a 1-lower alkyl-3-benzoyl-4-phenyl-1,2,5,6-tetrahydropyridine.

9. The process as in claim 8 wherein 1-methyl-3-carbethoxy-4-piperidone is reacted with the lithium phenyl to form 1-methyl-3-benzoyl-4-phenyl-1,2,5,6-tetrahydropyridine.

10. The process as in claim 8 wherein 1-ethyl-3-carbethoxy-4-piperidone is reacted with the lithium phenyl to form 1-ethyl-3-benzoyl-4-phenyl-1,2,5,6-tetrahydropyridine.

11. The process as in claim 8 wherein 1-isopropyl-3-carbethoxy-4-piperidone is reacted with the lithium phenyl to form 1-isopropyl-3-benzoyl-4-phenyl-1,2,5,6-tetrahydropyridine.

12. 1-methyl-3-benzoyl-4-phenyl-1,2,5,6-tetrahydropyridine hydrochloride.

13. 1-ethyl-3-benzoyl-4-phenyl-1,2,5,6-tetrahydropyridine hydrochloride.

JOHN THOMAS PLATI.
WILHELM WENNER.

REFERENCES CITED

The following references are of record in the file of this patent:

UNITED STATES PATENTS

| Number | Name | Date |
|---|---|---|
| 2,470,108 | Plati et al. | May 17, 1949 |

OTHER REFERENCES

Berichte de deut. Chem. Ges., 75 (1942), pp. 49–64.